United States Patent [19]

Meloon

[11] Patent Number: 4,568,363
[45] Date of Patent: Feb. 4, 1986

[54] METHOD FOR MAKING SINTERED ALUMINOUS ABRASIVE PARTICLES

[75] Inventor: David R. Meloon, Sanborn, N.Y.

[73] Assignee: Dresser Industries, Inc., Dallas, Tex.

[21] Appl. No.: 709,757

[22] Filed: Mar. 8, 1985

[51] Int. Cl.$^4$ .............................................. B24D 3/00
[52] U.S. Cl. ........................................ 51/293; 51/309
[58] Field of Search .................................. 51/309, 293

[56] References Cited

U.S. PATENT DOCUMENTS

| | | | |
|---|---|---|---|
| 2,947,056 | 8/1960 | Csorda's et al. | 51/293 |
| 3,003,919 | 10/1961 | Broge | 51/293 |
| 3,121,623 | 2/1964 | Nesin | 51/293 |
| 3,428,443 | 2/1969 | Davis, Jr. | 51/293 |
| 3,491,492 | 1/1970 | Veltz | 51/293 |
| 3,528,790 | 9/1970 | Shrewsburg et al. | 51/293 |
| 3,615,307 | 10/1971 | Jones | 51/293 |
| 4,130,402 | 12/1978 | Schepers et al. | 51/309 |
| 4,252,544 | 2/1981 | Takahashi | 51/309 |
| 4,308,088 | 12/1981 | Cherdron et al. | 51/309 |

Primary Examiner—Paul Lieberman
Assistant Examiner—Willie J. Thompson
Attorney, Agent, or Firm—Barry E. Deutsch

[57] ABSTRACT

A method of making sintered aluminous abrasives from uncalcined bauxite. The uncalcined bauxite is mixed with sulphuric acid and dissolved. This forms aluminum sulfate hydrate as a major product. The aluminum sulphate hydrate is then dried to form aluminum sulphate which is then calcined to form gamma alumina and sulphur trioxide. The sulphur trioxide is mixed with water to form sulphuric acid and is then recycled for further use as additional dissolving material. A slurry of the gamma alumina is prepared, poured into a container and then dried to form a cake known as an unfired body. The unfired body is then broken into particles and screened to size. Following this, the particles are sintered. The sintered particles are finally cooled, then screened into the various desired abrasive grit sizes. Alternate methods for forming the unfired body include: (1) extrusion of a paste made up of gamma alumina and water followed by drying of the extruded material; and (2) pressing the dry gamma alumina into compacted cakes.

11 Claims, 2 Drawing Figures

METHOD FOR MAKING SINTERED ALUMINOUS ABRASIVE PARTICLES

BACKGROUND OF THE INVENTION

1. Field of the Invention

This invention relates to abrasive materials and, more particularly, to methods for making sintered aluminous abrasive materials which may be utilized in products such as grinding wheels and in other abrasive applications.

2. Description of the Prior Art

The production of aluminous abrasive materials is well known. The two most common production techniques are the arc furnace technique and the sintering technique. In the arc furnace technique, the final product is generally known as a fused abrasive. In the sintering technique, the final product is generally known as a sintered abrasive. Both the fused abrasive materials and the sintered abrasive materials may be utilized in similar types of products.

In the arc furnace technique, the final abrasive material product is called fused because it results from a melting operation. Typically, such operations are costly, particularly because of the energy-intensive nature of the process. Such operations may also be dangerous due to the extremely high temperatures of fabrication involved. The temperatures involved are normally about 2000° C. At such temperatures, arc furnaces are prone to erupting and spewing forth quantities of molten alumina as a result of gas formation within the furnaces. In addition, the individual abrasive grains obtained via this process are produced by crushing large pieces of solidified furnace product. This is followed by collecting and screening out the various resultant sizes. Naturally, a whole range of sizes is produced, some of which are more in demand by the market than are others. A certain degree of control may be exercised during the crushing operations in order to minimize the production of particles of unwanted sizes. Their occurrence, however, persists and remains troublesome and expensive to manufactures of aluminous abrasives.

Sintered abrasives have been manufactured in the past in an attempt to reduce not only the operating temperatures required, but also the attendant potential hazards and the expense of making the abrasive grain particles of unwanted sizes. These sintered abrasives have been generally made from previously processed bauxite, specifically calcined bauxite and normally include a process which includes the step of milling. Such milling step, most often ball milling, can extend up to 24 hours in duration and normally results in a fine powder, typically a 5 micron average particle size. This powder is normally formed into granules and then sintered to form abrasive grains with essentially no unwanted sizes.

The present invention has for its objectives the manufacture of commercially acceptable sintered aluminous abrasive materials by improved methods which overcome many of the above mentioned disadvantages and shortcomings of the prior art. The method of the present invention eliminates the need for employing the arc furnace of the fusing method along with its attendant high temperatures, potential for dangerous explosions and excessively high costs. Also, the resulting powder is of a considerably greater surface area than that produced by the prior art sintering method by virtue of a finer particle size. This finer particle size results in a more highly reactive and more sinterable powder. In addition, the present method is advantageous as compared with the prior art sintering process since the slow milling step is avoided. The present invention also utilizes the less desirable production by-products of the manufacturing process in further processing for greater efficiency and economy of operation, as opposed to the fusing method.

The foregoing has outlined some of the more pertinent objects and advantages of the present invention. These objects and advantages should be construed to be merely illustrative of some of the more prominent features and applications of the instant invention. Many other beneficial results can be attained by applying the disclosed invention in a different manner or modifying the invention within the scope of the disclosure. Accordingly, other objects and advantages and a fuller understanding of the invention may be had by referring to the summary of the invention and the detailed description describing the preferred and alternate embodiments and examples in addition to the scope of the invention defined by the claims taken in conjunction with the accompanying drawing.

SUMMARY OF THE INVENTION

The invention is defined by the appended claims with specific embodiments and examples shown in the attached drawing. For the purpose of summarizing the invention, the invention may be incorporated into a method of forming sintered aluminous abrasive material including the steps of mixing uncalcined bauxite such as, but not limited to that shown in Table I, with hot sulphuric acid to dissolve the bauxite and form aluminum sulfate hydrate and residual materials such as oxides and/or hydroxides of iron, silicon and titanium.

In the instant invention, it is preferred to use sulphuric acid whose concentration is about 35% $H_2SO_4$ by weight. Other concentrations of sulphuric acid are also satisfactory for use and it is not an object of this invention to limit to 35% by citing that particular concentration. In fact, literature indicates that 30%–60% sulphuric acid is acceptable in this process (Kirk-Othmer Encyclopedia of Chemical Technology, 3rd edition, volume 2, page 248). The bauxite is usually crushed before adding it to the sulphuric acid. This is done in order to speed up the dissolution process and also to assure maximum dissolution of the aluminous portion of the bauxite. It has been found that crushing the bauxite to the point where it all passes through an 80 mesh screen, is usually satisfactory. After the dissolution of the bauxite, the mixture is allowed to stand for a short time in order to permit settling of coarse, undissolved residues. Some fine, undissolved impurities may remain suspended in the aluminum sulphate solution, but no difficulties have been encountered as a result thereof. After standing, the hot aluminum sulphate solution is either drawn off or decanted, leaving the coarser, undissolved residual material behind. Upon cooling, the aluminium sulphate solution solidifies at approximately 80° C. This is presumably due to the formation of aluminum sulphate hydrate at or near that temperature. The terms "aluminum sulphate solution" and "aluminum sulphate hydrate" are here used rather loosely. It should be remembered that both of them contain those impurities which were not removed when the "aluminum sulphate solution" was withdrawn from the reaction vessel. For simplicity, however, these terms will be used in the instant invention without repeatedly referring to the impurities.

The aluminum sulfate hydrate is heated to drive off the water and form aluminum sulphate. The aluminum sulfate is then calcined to form gamma alumina and sulphur trioxide.

The sulphur trioxide may be recycled in a known manner by adding water in order to produce (additional) sulphuric acid for use in a further dissolving step.

The gamma alumina is then formed into a shaped green body by mixing it with water and an appropriate dispersing agent such as citric acid. The resulting slurry is poured into containers and heated to form a dried cake. The dried cake, also known as a green body, is broken into granules and screened to produce desired particle sizes. A pressing or extruding process may, in the alternative, be utilized for the formation of the dry cakes. Un-wanted fine particles generated by the breakup of the dried cake may be recycled by mixing them with the proper amount of water and dispersant in order to make more slurry. The slurry is then treated in the manner described above. The remaining, properly sized granules from the green body are then sintered by heating for a predetermined period of time. Following this sintering step, the grains are cooled and then screened into various abrasive grit sizes.

The process generally begins with a quantity of uncalcined bauxite and sulphuric acid mixed in approximately a stoichiometric ratio based upon the alumina content of the bauxite with up to a 20% excess of sulphuric acid. The aluminum sulfate hydrate resulting from the dissolving step is then heated at atmospheric pressure at about 205° C. to produce anhydrous aluminum sulphate. The next step is calcination, which is generally carried out at about 900° C. to 1010° C., depending upon the length of time the material is kept at the temperature. Temperatures in the upper end of this range usually permit the use of shorter calcining times. Calcination may be carried out at a temperature as low as 770° C., but then quite lengthy calcination runs are required. The final sintering preferably occurs at 1450° C. at a time interval of 15 to 30 minutes under oxidizing conditions. A range of 1350° to 1550° C. at a time range of about 4 hours to about 10 minutes has also been found acceptable.

The foregoing has outlined rather broadly the more pertinent and important features of the present invention in order that the detailed description of the invention that follows may be better understood so that the present contribution to the art can be more fully appreciated. Additional features of the invention will be described hereinafter which form the subject of the claims of the invention. It should be appreciated by those skilled in the art that the conception and the specific embodiments and examples disclosed herein may be readily utilized as a basis for modifying or designing other methods for carrying out the same purposes of the present invention. It should be realized by those skilled in the art that such equivalent methods do not depart from the spirit and scope of the invention as set forth in the appendant claims.

BRIEF DESCRIPTION OF THE DRAWING

For a fuller understanding of the nature and the objects of the invention, reference should be had to the following detailed description taken in connection with the accompanying drawing in which.

DETAILED DESCRIPTION OF THE INVENTION

Primary Embodiment

Figure 1:
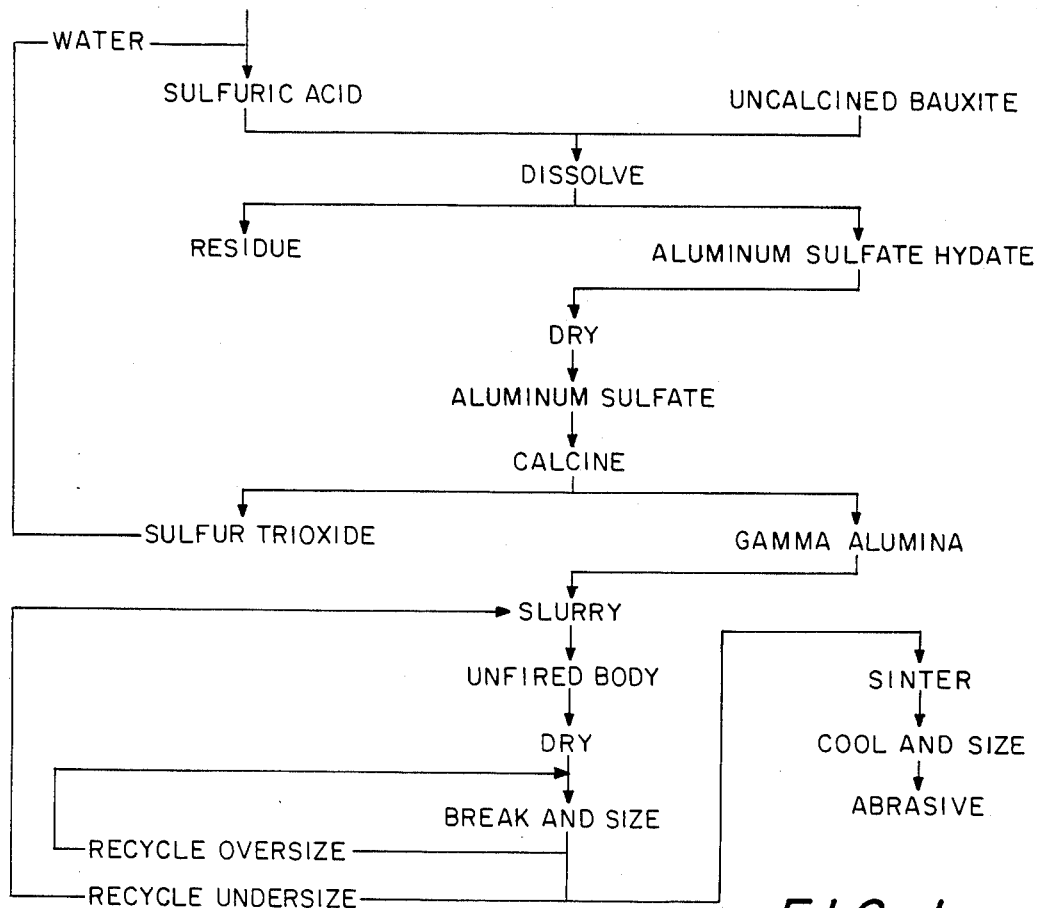
FIG. 1 is a flow chart showing the various steps of the present invention.

The preferred embodiment or example of the invention is illustrated in FIG. 1 of the appended drawing. In this preferred embodiment, 50 grams of uncalcined Surinam bauxite was mixed with 225 milliliters of 35% sulphuric acid. The mixture was stirred and a temperature of about 105° C. was maintained, using an electric heater. After 30 minutes, stirring was stopped and the solution was allowed to stand for a few minutes to permit settling of undissolved impurities, as discussed above. The solution, containing aluminum sulphate plus dissolved and/or suspended impurities, was poured off into containers and allowed to solidify. A residue, made up primarily of undissolved silicious and titaniferous sludge was left behind in the reaction vessel. The chemical makeup of the residual materials will vary as a function of the extraneous impurities existing in the initial uncalcined bauxite ore and as a function of whether the sludge and the supernatant liquid are separated after the dissolving step. The solidified aluminum sulphate hydrate was heated to 205° C. and kept at that temperature for about 90 minutes. This was sufficient to drive off most of the water. It should be understood that a great degree of latitude is permitted in this drying step for the removal of both free and chemically combined water. Variations in time, temperature and pressure are readily determinable by those skilled in the art.

After drying, the aluminum sulphate was crushed so as to pass through a 20 mesh screen. This crushing was carried out to: (1) facilitate the removal of sulphur trioxide in the subsequent calcination step; and (2) to permit easier passage of the material through the rotary tube furnace which was used to carry out the calcination. This crushing step need not always be performed if the calcination is carried out over an extended period of time in other types of calcining equipment.

The dried and crushed aluminum sulphate was then calcined at 1010° C. Calcination is the process in which a material such as the aluminum sulfate is heated at a relatively high temperature, but without fusing, to thereby drive off unwanted volatile materials and also to oxidize the remaining material. The process also acts to convert the initial aluminum sulfate material into a sinterable gamma alumina.

The principal by-product of the calcination is sulphur trioxide. The sulphur trioxide so produced is preferably recycled to the sulphuric acid initially used in dissolving the uncalcined bauxite. During such recycling, water is added to the sulphur trioxide to create new sulphuric acid which may then be used for further processing and generating additional aluminum sulphate hydrate.

About 32 grams of gamma alumina resulted from the calcination. This material was finely divided. Studies have shown that this gamma alumina had an ultimate particle size approximating 0.025 micrometers. These particles showed a certain degree of aggregation. This gamma alumina was first shaped into a green (unfired) body prior to sintering. The green body was formed by a slurry process including a prior mixing with water and an appropriate dispersing agent such as citric acid. The concentration of citric acid in the slurry was 1.5%, based on the total weight of the slurry. The concentration of gamma alumina was 42% by weight. This mixture was then poured into containers and dried to create a dried cake. Additional techniques may be utilized to form the dried cakes, as for example, pressing or extruding the gamma alumina material.

If the alternative pressing technique is used, the green body is formed by compacting the gamma alumina into a self-sustaining mass. The pressure applied is sufficient to compact each adjacent gamma alumina particle into intimate contact with each next adjacent particle whereby crystal growth is promoted at the points of contact. This step facilitates the subsequent sintering. Pressures of about 5 tons per square inch are generally sufficient.

Referring again to the slurry technique, the green body is dried by any of the well known heating techniques. It is then broken into granules and screened. Screening will yield particles of from about 24 to 36 mesh, with allowance made for the shrinkage during sintering. This is the preferred range for most commercial applications but may be varied as desired. The screened particles which are smaller than the desired sizes are recycled to the slurry for subsequent processing beginning with the green body forming step. The particles which are larger than the desired sizes are broken and screened again.

Figure 2:
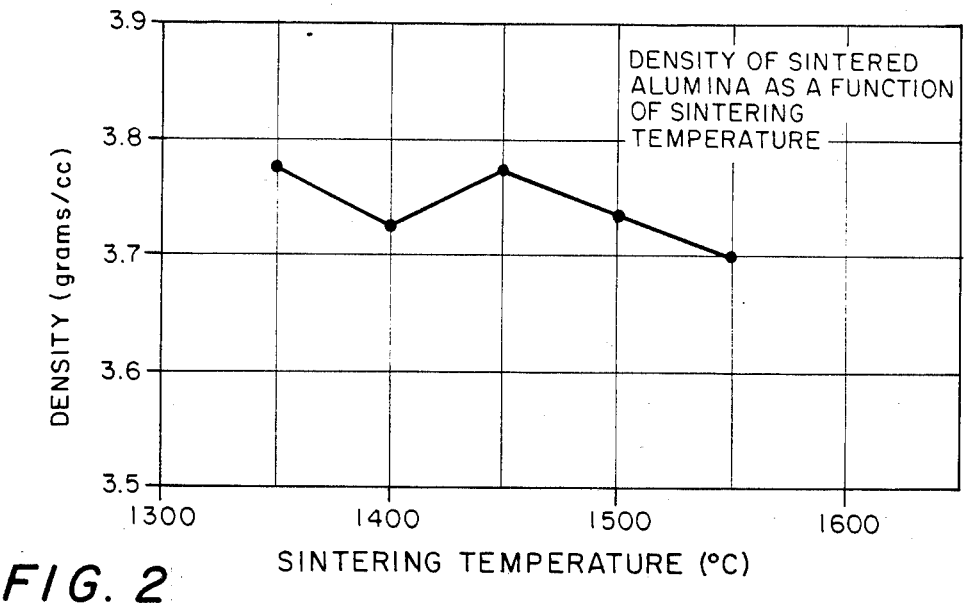
FIG. 2 is a graph illustrating how the density of sintered particles varies with temperature.

The remaining favorably sized gamma alumina particles are then sintered under oxidizing conditions at about 1450° C. for about 15 to 30 minutes. A wide range of temperatures and times have been found acceptable to effect the sintering, as for example, 1350° C. to 1550° C. at from about 4 hours to about 10 minutes. FIG. 2 is a graph showing how the density of the sintered particles varies with temperature over the range 1350° C. to 1550° C.

Sintering is the step of heating or firing a material wherein each grain recrystallizes to form a structure of interlocking crystals which imparts substantial hardness and mechanical strength to the individual particles so sintered. The sintering process also realigns the molecular structure of the gamma alumina to create a high density microcrystalline alpha alumina.

During the sintering step, the density of the grains increases due to the consolidation which accompanies the recrystallization. Because of this consolidation or shrinking, the screening of particles prior to the sintering should be done in order to yield sinterable particles of about 30% to about 40% larger on a linear dimension than the desired final sintered particle size. The degree of shrinkage is partially dependent upon the method used to produce the green body (slurry, extrusion, pressing, etc.) so the screening of the unsintered particles should be carried out according to the forming method which was used. The degree of shrinkage is readily determined by one skilled in the art.

Sintering appears to be a relatively simple thermal process. It is, however, a relatively complicated process involving either simultaneous or sequential changes in surface energy, vaporization-condensation, surface and bulk diffusion, plastic flow, pore shape, size and total pore volume reduction. It also involves shrinkage, recrystallization, grain growth and movement of grain boundaries. Other occurrences during such a heating or firing process may include solid state reactions, formation of new phases, polymorphic transformations and decompositions of crystalline compounds to form new phases.

The parameters such as temperature, pressure and time during which the sintering is to be accomplished, depend on several factors such as the size of the particles and the accessibility of oxygen. If sintering is carried out in a static bed, the depth of the bed, heat transfer rate and air supply may also be factors to be considered. The various parameters during sintering should be controlled carefully so that volatile matter may escape from the interior of the particles without generating undue pressures which may crack the particles. Some experimentation may be required to determine optimum parameters for a particular situation when deviating from the examples as set forth herein.

The sintered particles may then be cooled and sized to produce abrasive grains of commercial sizes for use in the subsequent fabrication of articles.

Additional Example

An additional example or embodiment of the method of the present invention includes mixing the same quantities of uncalcined bauxite, 50 grams, and 35% sulphuric acid, 225 milliliters, as set forth in the description of the preferred embodiment. The bauxite was dissolved and the resultant aluminum sulphate hydrate was dried, also as described above in the description of the preferred embodiment. Calcination was carried out at atmospheric pressure at 905° C. for 2 hrs. The resulting gamma alumina was formed into the green bodies through extrusion of a paste consisting of 37% gamma alumina and 63% water. The extruded bodies were dried, broken up and sintered. Sintering was carried out at 1450° C. under oxidizing conditions for 4 hours, resulting in a product with a density of 3.76 g/cc. The other method steps were also carried out in accordance with the preferred embodiment as described above including the recycling of the sulphur trioxide for further dissolving of the uncalcined bauxite as well as the recycling of the unwanted sizes of the broken green body.

Further Additional Example

In yet a further additional example or embodiment, the same quantities of uncalcined bauxite and sulphuric acid were mixed and the resulting aluminum sulfate hydrate dried as described in the prior examples. The dried aluminum sulfate was calcined at atmospheric pressure at 1010° C. for 15 minutes and the green body was formed by pressing. The pressing operation was carried out by loading a cylindrical steel mold, equipped with a plunger, with the gamma alumina from the calcination step. The plunger was inserted and pressure was applied using a conventional hydraulic press. The pressure was raised smoothly to 5 tons/square inch. This pressure was maintained for 1 minute and then released. The pressed disk of gamma alumina was removed from the mold, broken up, screened, and sintered. Sintering occurred under oxidizing conditions at 1550° C. for 4 hours, resulting in particles whose density was 3.70 g/cc. All of the other method steps were carried out in accordance with the procedures as set forth in the prior embodiments or examples as set forth above.

The chemical analysis of the uncalcined Surinam bauxite is set forth in Table I.

TABLE I

| CHEMICAL ANALYSIS OF UNCALCINED BAUXITE | |
|---|---|
| Constituent | Surinam Bauxite % By Weight |
| $SiO_2$ | 1.94 |
| $TiO_2$ | 2.37 |
| $Fe_2O_3$ | 4.11 |
| $Na_2O$ | 0.01 |
| $MgO$ | 0.01 |
| $Cr_2O_3$ | 0.05 |
| $CaO$ | 0.01 |
| Moisture | 0.90 |
| Loss on Ignition | 32.46 |
| $Al_2O_3$ (by difference) | 58.14 |

The present disclosure includes that contained in the appended claims as well as that of the foregoing description. Although this invention has been described in its preferred steps as set forth in the above described embodiments or examples, with a certain degree of particularity, it is understood that the present disclosure of the preferred forms has been made only by way of example and that numerous changes in the details of the method and steps may be resorted to without departing from the spirit and scope of the invention.

The embodiments of the invention in which an exclusive property or privilege is claimed are defined as follows:

1. A method for making sintered aluminous abrasive particles comprising the steps of:
    mixing a quantity of uncalcined bauxite and sulphuric acid to dissolve the acid-soluble portion thereof and form principally aluminum sulfate hydrate;
    calcining the aluminum sulfate hydrate to separately form gamma alumina and sulphur trioxide;
    forming said gamma alumina into an unfired body;
    breaking the unfired body into granules; and
    sintering such granules to convert said gamma alumina granules into sintered abrasive aluminous material of alpha alumina.

2. The method as set forth in claim 1, further including the steps of:
    recycling said sulphur trioxide;
    adding water to the recycled sulphur trioxide to form additional quantities of sulphuric acid; and
    using the additional quantities of sulphuric acid to dissolve the uncalcined bauxite.

3. The method as set forth in claim 1 wherein said calcining of aluminum sulphate hydrate is carried out at about 1010° C.

4. The method as set forth in claim 1 wherein the sintering is carried out between about 1350° C. and 1550° C. for between about 4 hours and 10 minutes.

5. The method as set forth in claim 4 wherein the sintering is carried out at about 1450° C. for between about 15 to 30 minutes.

6. The method as set forth in claim 1 wherein the unfired body is formed by drying a slurry composed of gamma alumina, water and a dispersing agent.

7. The method as set forth in claim 6 and further including the step of recycling to the slurry undersized granules from the unfired body prior to sintering.

8. The method as set forth in claim 6 and further including the step of recycling for further breaking oversized granules from the unfired body prior to sintering.

9. The method as set forth in claim 1 wherein the unfired body is formed by pressing the gamma alumina into compacted cakes.

10. The method as set forth in claim 1 wherein the unfired body is formed by extruding a paste consisting substantially of gamma alumina and water.

11. A method of making sintered aluminous abrasive particles comprising the steps of:
    mixing a quantity of uncalcined bauxite and sulfuric acid to dissolve the bauxite and form a residue of oxides and/or hydroxides of iron, silicon and titanium as well as impure aluminum sulfate hydrate which contains soluble forms of iron, silicon and titanium;
    drying the impure aluminum sulfate hydrate at about 205° C. to form impure aluminum sulfate;
    calcining the impure aluminum sulfate at 1010° C. to form impure gamma alumina and sulphur trioxide;
    recycling the sulphur trioxide back to the aforementioned sulphuric acid and adding water thereto;
    mixing the impure gamma alumina with water and a dispersing agent to form a slurry, which is poured into containers and dried to form an unfired body;
    breaking and sizing the unfired body into particles;
    recycling particles of unwanted fine sizes to the slurry;
    recycling particles of unwanted oversize for further breaking;
    sintering the remaining particles to convert the impure gamma alumina to impure alpha alumina whose density is at least 3.6 g/cc; and
    cooling and sizing the sintered particles into final sintered aluminous abrasive particles.

* * * * *